United States Patent
Hwang et al.

(10) Patent No.: US 10,682,599 B2
(45) Date of Patent: Jun. 16, 2020

(54) FILTER MEDIUM FOR LIQUID FILTER AND METHOD FOR MANUFACTURING SAME

(71) Applicant: AMOGREENTECH CO., LTD., Gimpo-si (KR)

(72) Inventors: Jun Sik Hwang, Incheon (KR); In Yong Seo, Seoul (KR)

(73) Assignee: AMOGREENTECH CO., LTD., Gimpo-si (KR)

(*) Notice: Subject to any disclaimer, the term of this patent is extended or adjusted under 35 U.S.C. 154(b) by 0 days.

(21) Appl. No.: 16/284,382

(22) Filed: Feb. 25, 2019

(65) Prior Publication Data
US 2019/0184318 A1 Jun. 20, 2019

Related U.S. Application Data

(60) Division of application No. 15/000,347, filed on Jan. 19, 2016, now abandoned, which is a (Continued)

(30) Foreign Application Priority Data

Aug. 6, 2013 (KR) .......... 10-2013-0093196
Jul. 24, 2014 (KR) .......... 10-2014-0994114

(51) Int. Cl.
*B01D 39/00* (2006.01)
*B32B 5/00* (2006.01)
(Continued)

(52) U.S. Cl.
CPC ......... *B01D 39/1623* (2013.01); *B01D 69/10* (2013.01); *B29C 70/504* (2013.01);
(Continued)

(58) Field of Classification Search
CPC ........ B01D 39/00; B01D 39/14; B01D 39/16; B01D 39/1607; B01D 39/1623;
(Continued)

(56) References Cited

U.S. PATENT DOCUMENTS 6,706,361 B1   3/2004 Economy et al.
2003/0177909 A1  9/2003 Koslow
(Continued)

FOREIGN PATENT DOCUMENTS

CN   103429277 A   * 12/2013
KR   1020050081606   8/2005
(Continued)

OTHER PUBLICATIONS

International Search Report—PCT/KR2014/006788 dated Nov. 25, 2014.

*Primary Examiner* — Allison G Fitzsimmons
(74) *Attorney, Agent, or Firm* — Cantor Colburn LLP

(57) ABSTRACT

Provided are filter media for liquid filters and a method of manufacturing the same, in which a thin filter layer is formed and the content of nanofibers weighs light, by laminating a low weight nanofiber web on a porous nonwoven fabric, and thus a less differential pressure is applied before and after filtering, to thereby increase a pass flow rate. The filter medium includes: a porous support that plays a strength support role; and a nanofiber web that is laminated on one side of the porous support and is made of nanofibers of a polymer material, in which the nanofiber web comprises fine pores of a three-dimensional structure, through which a liquid to be treated passes, wherein content of the nanofibers is less than 5 gsm.

7 Claims, 3 Drawing Sheets

Related U.S. Application Data continuation-in-part of application No. PCT/KR2014/006788, filed on Jul. 25, 2014.

(51) Int. Cl.

| | | |
|---|---|---|
| *B01D 39/16* | (2006.01) | |
| *B01D 69/10* | (2006.01) | |
| *D04H 1/728* | (2012.01) | |
| *D01D 5/00* | (2006.01) | |
| *B29C 70/50* | (2006.01) | |
| *B32B 5/26* | (2006.01) | |
| *B32B 5/02* | (2006.01) | |
| *B32B 5/08* | (2006.01) | |

(52) U.S. Cl.
CPC ............ *B32B 5/00* (2013.01); *D01D 5/003* (2013.01); *D04H 1/728* (2013.01); *B01D 2239/025* (2013.01); *B01D 2239/065* (2013.01); *B01D 2239/0654* (2013.01); *B01D 2323/39* (2013.01); *B01D 2325/42* (2013.01); *B32B 5/022* (2013.01); *B32B 5/08* (2013.01); *B32B 5/26* (2013.01); *B32B 2262/0238* (2013.01); *B32B 2262/0253* (2013.01); *B32B 2262/0276* (2013.01); *B32B 2262/04* (2013.01); *B32B 2262/12* (2013.01); *B32B 2264/0228* (2013.01); *B32B 2264/0235* (2013.01); *B32B 2264/10* (2013.01); *B32B 2307/718* (2013.01); *B32B 2307/726* (2013.01); *B32B 2307/728* (2013.01); *B32B 2307/73* (2013.01); *B32B 2307/732* (2013.01)

(58) Field of Classification Search
CPC ......... B29C 70/28; B29C 70/16; B29C 70/12; B29C 70/18; B29C 70/22; B29C 70/40; B29C 70/42; B29C 70/502; B32B 5/00; B32B 5/02; B32B 5/22; B32B 5/24; B32B 5/32; B32B 32/00; B32B 32/02; B32B 32/025; B32B 32/04; B32B 32/06; B32B 2250/00; B32B 2250/02; B32B 2250/03; D01D 1/00; D01D 1/02; D01D 1/04; D01D 1/06; D01D 1/065; D01D 5/00; D01D 5/0007; D01D 5/02; D01D 5/08; D01D 5/084; D01D 5/38; D04H 1/00; D04H 1/04

USPC ........... 264/41, 48, 165, 175, 176.1, 211.12; 210/660, 749, 503, 505, 600; 57/31, 362

See application file for complete search history.

(56) References Cited

U.S. PATENT DOCUMENTS

| | | | |
|---|---|---|---|
| 2009/0032475 | A1 | 2/2009 | Ferrer et al. |
| 2009/0163102 | A1* | 6/2009 | Drapela ............. B01D 39/1623 442/330 |
| 2009/0261035 | A1* | 10/2009 | Arora ................... B01D 39/163 210/510.1 |
| 2010/0151760 | A1* | 6/2010 | Laura, Jr. ................ B32B 27/12 442/364 |
| 2010/0282682 | A1 | 11/2010 | Eaton et al. |

FOREIGN PATENT DOCUMENTS

| | | |
|---|---|---|
| KR | 1020070055213 | 5/2007 |
| KR | 1020080060263 | 7/2008 |
| KR | 1020120002491 | 1/2012 |
| WO | 2012002754 | 1/2012 |

\* cited by examiner

FILTER MEDIUM FOR LIQUID FILTER AND METHOD FOR MANUFACTURING SAME

TECHNICAL FIELD

The present invention relates to filter media for liquid filters and a method of manufacturing the same, and more particularly, to filter media for liquid filters and a method of manufacturing the same, in which a thin filter layer is formed and the content of nanofibers weighs light, by laminating a low weight nanofiber web on a porous nonwoven fabric, and thus a less differential pressure is applied before and after filtering, to thereby increase a pass flow rate.

BACKGROUND ART

Recent industrial advancement has required high purity and high quality of products, and thus a separator (or a membrane) technology has been recognized as a very important field. In the environmental sector, especially as the need for clean water and the awareness of a lack of water increases, a technology of using a membrane has largely attracted much attention as one of ways to solve these problems. Processes such as water purification, sewage, waste water, and desalination using a membrane, are already rapidly spreading. In addition, the membrane technology has been developed for applications away from the membrane itself, and has expanded into surrounding technology development and has also enhanced membrane performance improvement according to applications as well.

The membrane is a substance having a selection capability that is present between two different materials. In other words, the membrane means a substance which serves to selectively pass or to exclude a material. Structures and substances of the membrane, and conditions and principles of the movement of the materials passing through the membrane, have no limitations. When a substance is located between only two materials to isolate the two materials each other and the selective movement of the materials through the substance between the two materials occurs, the substance may be called a membrane.

The membranes are of a very variety of types and are classified into several criteria.

First, a classification by a separation operation is a classification method depending upon the state of a target material to be separated, and is classified into a liquid separation method, a gas-liquid separation method, a gas separation method, and so on. The liquid separation method is classified into micro filtration, ultra filtration, nano filtration, reverse osmosis filtration, etc., in accordance with the size of an object for filtration. The gas separation method is classified in detail in accordance with the type of gas to be separated. The gas separation membrane is classified into an oxygen-enriched membrane for separating the oxygen gas, a nitrogen-enriched membrane for separating the nitrogen gas, a hydrogen-enriched membrane for separating the hydrogen gas, a dehumidifying film for removing humidity, etc.

The membrane is classified according to a film-like shape, and is classified into a flat membrane, a hollow fiber membrane, a tubular membrane, etc. In addition, the membrane is also classified into a plate-shaped type, a spiral wound type, a cartridge type, a flat membrane cell type, an immersion type, a tubular type, and so on, depending on the form of a filter module.

The membrane is classified according to a material and is classified into an inorganic film and an organic film using a polymer film. In recent years, however the inorganic films expand their use based on the advantages of heat resistance, durability, etc., most currently commercialized products are occupied by the polymer membranes.

In general, filtration means to remove two or more components from a fluid, that is, it means to separate non-dissolved particles (that is, solid) from the fluid. Filtering mechanisms in the separation of the solid materials may be described as sieving, adsorption, dissolution, diffusion mechanisms. Except for some membranes such as gas separation membranes, reverse osmosis membranes, etc., it can be said that most of the filtering mechanisms depend entirely on the sieving mechanism.

Therefore, it is possible to use any materials with pores as filter media. Nonwoven fabrics (nonwovens), woven fabrics (wovens), meshes, porous membranes and the like are typical filter media.

It is difficult to make pores not more than 1 μm in the case of nonwovens, wovens, meshes, etc. Thus, the nonwovens, wovens, meshes, etc., are used as a pretreatment filter concept with a limitation to a particle filtration area. Meanwhile, porous membranes can make precise and small pores and have been used for a process requiring a wide range of filtration areas and the highest precision such as micro filtration, ultra filtration, nano filtration, reverse osmosis filtration, etc.

Since the nonwovens, wovens, or meshes are made of fibers having a thickness from several micrometers to several hundreds of micrometers, it is difficult to make fine pores not more than 1 μm. In particular, it is not possible actually to create uniform pores since webs are formed by random arrangement of fibers in the case of the nonwoven fabrics. The melt-blown nonwoven fabric may be called a nonwoven fabric made of a very fine fiber having a diameter of 1~5 μm. The pore size before heat calendering is not less than six micrometers and the pore size after heat calendering is only three micrometers approximately. The deviation in the average pore size occurs by ±15% or more around a reference point, and the melt-blown nonwoven fabric has a structure in which very large pores coexist. Accordingly, the nonwovens, wovens, or meshes have the difficulty in preventing the leakage of contaminated materials through relatively large pores and thus have low filter efficiency. Therefore, the filter media are used in an inaccurate filtration process or used as a pre-treatment concept of an accurate filtration process.

Meanwhile, the porous membrane is prepared by a method such as a non-solvent induced phase separation (NIPS) process, a thermally induced phase separation (TIPS) process, a stretching process, a track etching process, a sol-gel process, etc. The materials of most of the porous membranes are made of representative organic polymers, such as polytetrafluoroethylene (PTFE), polyvinylidene fluoride (PVdF), nylon (Nylon6 or Nylon66), polysulfone (PS), polyethersulfone (PES), polypropylene (PP), polyethylene (PE), nitrocellulose (NC) or the like. While the conventional porous membranes may create pores of precise and small size, closed pores or blinded pores may be created inevitably in the manufacturing process. As a result, the conventional porous membranes have problems such as a small flow amount of filtration, a high driving pressure, and a short filtration lift cycle, to thus cause high operating costs and frequent filter replacement.

Therefore, it is in an urgent situation to develop a membrane of a long lifetime and a high efficiency having constant filtering performance and stability according to the pore size as a thin film of a micro-porous structure so as to be used for the liquid treatment.

Korean Patent Application Publication No. 2008-60263 (Patent Document 1) discloses a filtering medium including at least one nanofiber layer of polymeric nanofibers having an average fiber diameter of less than about 1 μm, in which a mean flow pore size is about 0.5 μm to about 5.0 μm, and also that a solidity is about 15% by volume to about 90% by volume, and a water flow rate through the medium at a differential pressure of 10 psi (69 kPa) exceeds about 0.055 L/min/cm$^2$.

The method of manufacturing a filtering medium proposed in Patent Document 1 discloses spinning nanofibers by an electro-blown spinning method or an electric blowing method by using a solution containing nylon of 24 wt % in a formic acid as a polymer solution, including at least one spinning beam comprising spinnerets, blowing gas injection nozzles and collectors, to thereby form webs.

However, the method of forming a fibrous web of nanofibers in the patent document 1 cannot be referred to a manufacturing technique that uses a multi-hole spinning pack. In addition, when manufacturing a nanofiber web by an electrospinning method in an electrobrown spinning apparatus using a multi-hole spinning the pack in order to increase productivity, a spinning solution containing a polymer of 24 wt % increases the viscosity and is solidified at the surface of the spinning solution, to thus make it difficult to spin for a long time, and increases the fiber diameter, to thus cause a problem that it is not possible to make the fibrous form of not more than a micrometer in size.

Furthermore, in the case that the ultrafine fiber web obtained by electrospinning does not go through a pretreatment process of appropriately adjusting the amount of the solvent and moisture remaining on the surface of the web before performing calendering, pores are increased but the strength of the web is weakened. Otherwise, in the case that evaporation of the solvent is performed too slowly, a phenomenon of melting the web may occur.

Meanwhile, Korean Patent Application Publication No. 2012-2491 (Patent Document 2) discloses a filter medium for a liquid filter, a method of manufacturing the same, and a liquid filter using the same, using an electrospun nanofiber web to have a multi-layer structured three-dimensional micro-porous structure to thereby have high efficiency and long lifetime and maximize filter efficiency.

The filter media made of a multi-layer nanofiber web for liquid filters are prepared by air-electrospinning a spinning solution on top of a support to thus form a nanofiber web, in which the spinning solution is obtained by dissolving a fiber forming polymer material in a solvent, thermo-compression bonding the support in which the nanofiber web has been formed, or air-electrospinning a spinning solution to thus form and thermo-compression bond a nanofiber web, to then laminate the support on one side of the thermo-compression bonded nanofiber web.

However, the process of thermo-compression bonding the support in which the nanofiber web has been formed after air-electrospinning the spinning solution on top of the support to thus form a nanofiber web, in the method of preparing the filter media for liquid filters, may use a porous nonwoven fabric having a high tensile strength as the support, to thereby increase the tensile strength and have the benefit of increasing the ease of handling during the production but may cause a problem that uniformity of the nanofiber web is not high.

Generally, the electrospun nanofibers are integrated in a collector, that is, bring about an integration phenomenon, and laminated along a pattern of an integrated portion, that is, bring about a lamination phenomenon. For example, when electrospinning is executed on a diamond pattern, nanofibers starts to be integrated along a first diamond pattern.

Therefore, in the case of forming a nanofiber web by spinning nanofibers directly on a nonwoven fabric, as disclosed in Patent Document 2, there exist problems that a nanofiber web having excellent uniformity cannot be obtained in view of a nanofiber web pore size, permeability, thickness, weight, and so on.

In Patent Document 2, was proposed filter media that are laminated with a nanofiber web by using a nonwoven fabric made of a fiber with a single core structure such as a melt-blown nonwoven fabric, a spun bond nonwoven fabric, and a thermal bond nonwoven fabric, but it is difficult to maintain a pore structure in any one of the nonwoven fabric and the nanofiber web since calendering is performed at a relatively lower melting point of melting points of the nonwoven fabric and the nanofiber web when the nonwoven fabric and the nanofiber web are laminated on each other.

Further, as disclosed in Patent Document 2, in the case of making filter media by air-electrospinning a spinning solution to thus form nanofiber web, thermo-compression bonding the nanofiber web, and then laminating a support on one surface of the thermo-compression bonded nanofiber web or in the case of making filter media with only nanofibers by themselves, the filter media of a heavy weight of about 10 g/m$^2$ or more are required in order to handle the filter media. However, the heavy-weight of the filter media is a factor directly connected with a production rate, to thus cause high costs.

In addition, nanofibers have a large amount of static electricity in a manufacturing process, and thus when the filter media include only nanofibers themselves, it is quite difficult to handle the filter media. It is not possible to remove the static electricity through a composition such as lamination, but it is possible to improve handling properties. Furthermore, although nanofibers may have good relative intensities as compared with the other fibers, the absolute strengths of nanofibers are prone to be weak.

In addition, a porous nanofiber web made of nanofibers may create a rigid coupling between the fibers through a calendering process, to thus create a highly matured porous nanofiber web. However, when performing a calendering process by spinning a spinning solution directly onto a nonwoven fabric as disclosed in Patent Document 2, the melting point of the nonwoven fabric is lower than an inter-fiber bonding temperature of the nanofibers made of a polymer, to accordingly limit a calendering temperature control. As a result, a rigid coupling between the nanofibers to form the nanofiber web cannot be made.

The property of hydrophilicity is required in the liquid filtration. However, when preparing the filter media by using the hydrophilic polymer, there is a problem that the hydrophilic polymer is weak in the mechanical strength and the chemical resistance as compared to the hydrophobic polymer and thus should be used limitedly.

As a result, the filter media made of a PVdF polymer have a very suitable strength and chemical resistance to liquid filtration, but there is a problem that the filter media are limitedly used in aqueous filtration because of the hydrophobic property. In addition, in the case that the filter media made of a hydrophobic polymer are made of a heavy weight of about 10 g/m$^2$ or more so as to be handled in the manufacture process, a relatively high differential pressure is applied across the filter media when an aqueous fluid passes through the filter media. Accordingly, in the case that the hydrophilic treatment is performed or not, there is a problem that water does not pass through the filter media well if an appropriate force is not applied across the filter media.

In addition, in the case of making the filter media made of only nanofibers themselves of a heavy weight of about 10 g/m² or more, a thin filter layer cannot be formed. Thus, since a high differential pressure is applied across the filter media, there is a problem that a pass flow rate becomes little.

In general, methods of treating water pollutants may include a co-precipitation method of using a waste water treatment coagulant, a flotation method according to a specific gravity difference, a bioaccumulation method, an ion exchange adsorption method, etc. However, the ion exchange adsorption method has been known as the most effective method from among them.

SUMMARY OF THE INVENTION

To solve the above problems or defects, it is an object of the present invention to provide a filter medium for liquid filters and a method of manufacturing the same, in which a light weight nanofiber web is laminated on a porous nonwoven fabric to thereby form a thin filter layer and make the content of nanofibers per unit area into a light weight to thus apply a less differential pressure across the filter medium before and after filtration to increase a pass flow rate and as a result a membrane with excellent air permeability and excellent water permeability can be prepared even if the hydrophilic treatment may not be performed by using a nanofiber web made of light weight nanofibers even with the use of a hydrophobic PVdF polymer.

It is another object of the present invention to provide a filter medium for liquid filters and a method of manufacturing the same, in which a transfer method of spinning nanofibers on a transfer sheet such as paper and laminating the nanofiber spun transfer sheet on a porous nonwoven fabric, is used, and thus a nanofiber web having excellent uniformity can be obtained in view of a pore size, permeability, thickness, weight, and so on of the nanofiber web.

It is still another object of the present invention to provide a filter medium for liquid filters and a method of manufacturing the same, in which a transfer method of spinning nanofibers on a transfer sheet such as paper and laminating the nanofiber spun transfer sheet on a porous nonwoven fabric, is used, and thus a calendaring process may be executed at a temperature above a melting point of the nonwoven fabric to thereby create a rigid coupling between the nanofibers.

It is yet another object of the present invention to provide a filter medium for liquid filters and a method of manufacturing the same, in which a transfer method of spinning nanofibers on a transfer sheet such as paper and laminating the nanofiber spun transfer sheet on a porous nonwoven fabric, is used, and thus a residual solvent contained in a nanofiber web is absorbed to thereby prevent a re-melting phenomenon that the nanofibers are melted again in the residual solvent and to also properly adjust the amount of the residual solvent.

It is a still yet another object of the present invention to provide a filter medium for liquid filters which can use a porous nonwoven fabric that can be used as a support and available at a lower cost to thus increase a tensile strength to thereby increase the handleability during production and to thus greatly reduce a manufacturing cost by laminating a thin film porous nanofiber web on the porous nonwoven fabric.

It is a further object of the present invention to provide a filter medium for liquid filters and a method of manufacturing the same, in which a surface filtration and a depth filtration of a liquid can be performed with a nanofiber web having three-dimensional fine pores, and particular ions of a chemical substance contained in the liquid to be treated can be filtered by ion exchange resin particles dispersed inside or outside nanofibers of the nanofiber web.

It is a still further object of the present invention to provide a filter medium for liquid filters and a method of manufacturing the same, in which quality of a liquid to be treated is purified by Ag nanoparticles distributed inside or on the surfaces of nanofibers of a nanofiber web, and a variety of pathogens that are present in the filter media are also killed.

To accomplish the above and other objects of the present invention, according to an aspect of the present invention, there is provided a filter medium for liquid filters, the filter medium comprising: a porous support that plays a strength support role; and a nanofiber web that is laminated on one side of the porous support and is made of nanofibers of a polymer material, in which the nanofiber web comprises fine pores of a three-dimensional structure, through which a liquid to be treated passes, wherein content of the nanofibers is less than 5 gsm.

When the content of the nanofibers is less than 5 gsm, air permeability and water permeability are ensured even though the nanofiber web is made by laminating hydrophobic nanofibers, to thus obtain an excellent pass flow rate, but when the content of the nanofibers exceeds 5 gsm, a filter layer becomes thick to thereby cause a phenomenon that a more differential pressure is applied and a pass flow rate is reduced.

Preferably but not necessarily, the content of the nanofibers is set to range from 2 to 3 gsm.

Preferably but not necessarily, thickness of the nanofiber web is set to range from 2 to 6 μm, and a pore size thereof is set to 0.2 to 3 μm.

Preferably but not necessarily, diameter of the nanofibers is set to range from 100 to 800 nm, and more preferably diameter of the nanofibers is set to range from 150 to 300 nm.

Preferably but not necessarily, the porous support is a nonwoven fabric, in which the nonwoven fabric is made of a PP/PE nonwoven fabric in which PE is coated on an outer periphery of a PP fiber as a core, or a PET (polyethyleneterephthalate) nonwoven fabric in which low melting point PET is coated on an outer periphery of a regular PET fiber as a core.

The PP/PE nonwoven fabric is combined with the nanofibers by melting a PE coating portion coated on an outside of the PP fiber, and the PP fiber maintains a porous structure. In addition, the PET nonwoven fabric is combined with the nanofibers by melting the low melting point PET coated on the outer periphery of the regular PET fiber, and the regular PET fiber maintains a porous structure.

Preferably but not necessarily, the nanofibers are configured so that ion exchange resin particles are dispersed inside or on the surfaces of the nanofibers, and the ion exchange resin particles are particles of a porous organic polymer with an ion exchange capacity or particles of a copolymer of polystyrene and divinylbenzene.

In addition, the nanofibers are configured so that the Ag metal salts are dispersed inside or on the surfaces of the nanofibers.

According to another aspect of the present invention, there is also provided a method of manufacturing a filter medium of liquid filters, the method comprising: electrospinning a spinning solution that is formed by mixing a polymer material with a solvent on a transfer sheet, thereby forming a nanofiber web having fine pores of a three-dimensional structure; performing a primary calendering process of combining the nanofibers and simultaneously adjusting pore sizes and thicknesses of the nanofiber web; and performing a secondary calendering process of laminating the nanofiber web having undergone the primary calendaring process on a porous support to thus form the filter medium.

Preferably but not necessarily, the primary calendering process is performed at a higher temperature than that of the secondary calendering process.

Preferably but not necessarily, the primary calendering process is set at a temperature capable of combining the nanofibers to form a nanofiber web, and wherein the secondary calendering process is set at a temperature identical to a melting point of a coating portion having the melting point lower than that of a core of a double core fiber forming a porous support, in which the coating portion is melted and combined with the nanofibers.

Preferably but not necessarily, the spinning solution further comprises ion exchange resin particles or Ag metal salts, in which the nanofibers are configured so that the ion exchange resin particles or the Ag metal salts are dispersed inside or on the surfaces of the nanofibers.

Preferably but not necessarily, the transfer sheet is any one of paper, a nonwoven fabric made of a polymeric material that is not dissolved by the solvent contained in the spinning solution, and a polyolefin-based film.

As described above, the present invention provides a filter medium for liquid filters and a method of manufacturing the same, in which a light weight nanofiber web is laminated on a porous nonwoven fabric to thereby form a thin filter layer and make the content of nanofibers per unit area into a light weight to thus apply a less differential pressure across the filter medium before and after filtration to increase a pass flow rate and as a result a membrane with excellent air permeability and excellent water permeability can be prepared even if the hydrophilic treatment may not be performed by using a nanofiber web made of light weight nanofibers even with the use of a hydrophobic PVdF polymer.

That is, in general, as a filter layer becomes thick, a phenomenon of generating a lot of differential pressure and reducing a pass flow rate occurs, but a light weight porous nanofiber web is laminated on a porous nonwoven fabric to thereby form a thin filter layer to thus apply a less differential pressure across the filter medium to thus increase a pass flow rate.

The present invention uses a transfer method of spinning nanofibers on a transfer sheet such as paper and laminating the nanofiber spun transfer sheet on a porous nonwoven fabric, to thus obtain a nanofiber web having excellent uniformity in view of a pore size, permeability, thickness, weight, and so on of the nanofiber web.

The present invention uses a transfer method of spinning nanofibers on a transfer sheet such as paper and laminating the nanofiber spun transfer sheet on a porous nonwoven fabric, and thus executes a calendaring process at a temperature above a melting point of the nonwoven fabric before a laminating process to thereby create a rigid coupling between the nanofibers.

The present invention uses a transfer method of spinning nanofibers on a transfer sheet such as paper and laminating the nanofiber spun transfer sheet on a porous nonwoven fabric, to thus absorb a residual solvent contained in a nanofiber web to thereby prevent a re-melting phenomenon that the nanofibers are melted again in the residual solvent and to also properly adjust the amount of the residual solvent.

The present invention uses a porous nonwoven fabric that can be used as a support and available at a lower cost in which a tensile strength can be increased, to thereby increase the handleability during production and greatly reduce a manufacturing cost by laminating a thin film porous nanofiber web on the porous nonwoven fabric.

The present invention uses a porous support made of fibers of a double core structure and having respectively different melting points, to thus execute a calendaring process at a melting point of a low melting point coating portion that surrounds a high melting point core when executing the calendaring process in order to laminate a porous support on a nanofiber web, to thereby enable the porous support to maintain a pore structure a high melting point core fiber.

Further, the low melting point coating portion of the porous support is combined with (bonded with) nanofibers of a nanofiber web to thereby increase a coupling force.

The present invention can filter particular ions of a chemical substance contained in a liquid to be treated by ion exchange resin particles dispersed inside or outside nanofibers of a nanofiber web. The present invention can purify quality of a liquid to be treated by Ag nanoparticles distributed inside or on the surfaces of nanofibers of a nanofiber web, and eradicate a variety of pathogens that are present in a filter medium.

DETAILED DESCRIPTION OF THE INVENTION

Figure 1:
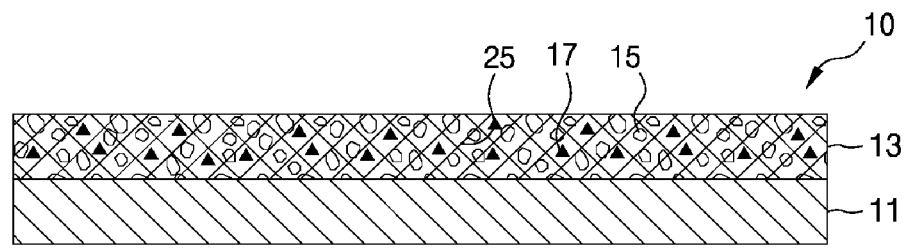
FIG. 1 is a cross-sectional view of a filter medium for liquid filters according to a preferred embodiment of the present invention.

Hereinafter, filter media for liquid filters and a method of manufacturing the same embodiments of the present invention will be described with reference to the accompanying drawings. In the process, the sizes and shapes of components illustrated in the drawings may be shown exaggerated for convenience and clarity of explanation. Further, by considering the configuration and operation of the present invention, the specifically defined terms may be changed according to user's or operator's intention, or the custom. Definitions of these terms herein need to be made based on the contents across the whole application.

The electrospun nanofibers are collected on a collector and are laminated along a pattern of the collector. For example, when the nanofibers are electrospun on a diamond pattern, the nanofibers start to be collected along the initial diamond pattern.

Thus, in order to make a nanofiber web having good uniformity such as a pore size, permeability, thickness, and weight, paper is more suitable than a nonwoven fabric.

The present invention uses a transfer method of spinning nanofibers on a transfer sheet such as paper and laminating the nanofiber spun transfer sheet on a porous nonwoven fabric, to thus make a nanofiber web having good uniformity such as a pore size, permeability, thickness, and weight.

The porous nanofiber web made of nanofibers may create a rigid coupling between the fibers through a calendering process, to thus create a highly matured porous nanofiber web. However, when performing a calendering process by spinning a spinning solution directly onto a nonwoven fabric used as a nonwoven fabric, a calendering temperature control is limited due to the melting point of the nonwoven fabric.

A bonding temperature between nanofibers, for example, PVdF fibers is about 150° C., but a melting point of the nonwoven fabric is in the range of 110~130° C.

The present invention prepares filter media by using the transfer method of forming a nanofiber web and then laminating the nanofiber web on a porous nonwoven fabric.

Thus, a primary calendering process is executed for the nanofiber web that is obtained by spinning nanofibers on the transfer sheet such as paper, at a temperature higher than the melting point of the nonwoven fabric, preferably at an inter-fiber bonding in temperature of the nanofibers, to thereby achieve a rigid coupling between the nanofibers. Then, the nanofiber web having undergone the primary calendering is laminated on a porous nonwoven fabric by a secondary calendaring process whose temperature is set to a melting point of the nonwoven fabric.

Thus, the primary calendering temperature is a temperature at which nanofibers to form a nanofiber web can be combined, for example, is set to 150 to 200° C., and the secondary calendering temperature is preferably set to 110~130° C. that is the melting point of a coating portion coated on an outside of a core in a PP/PE nonwoven fabric made of PP/PE fibers of a double core structure, for example, PE.

Accordingly, when the secondary calendering is executed, the PE coating portion coated on the outside of the core in the PP/PE nonwoven fabric is melted and laminated with the nanofiber web and a PP core maintains its shape to thus maintain a porous structure.

In the present invention, a transfer sheet having a high tensile strength is continuously fed to the top of a collector of an electrospinning device from a transfer roll in order to improve operability of the primary and secondary calendering processes, to thereby form a laminated porous nanofiber web on top of the transfer sheet.

The transfer sheet may employ, for example, paper, a nonwoven fabric made of a polymer material that is not made soluble by a solvent contained in a mixed spinning solution during spinning the mixed spinning solution, or a polyolefin-based film such as PE or PP. In the case that the transfer sheet is made of only the porous nanofiber web itself, the transfer sheet has a low tensile strength, and thus it is difficult to execute a drying process, a calendaring process and a winding process while the transfer sheet is fed at a high feed rate.

Furthermore, it is difficult to consecutively execute a laminating process with a subsequent support at a high feed rate after producing the porous nanofiber web, but in the case of using the transfer sheet, a sufficient tensile strength is provided to thus significantly increase a processing speed.

In the case of using only the porous nanofiber web, a phenomenon that the porous nanofiber web is stuck to other objects due to static electricity occurs and thus workability falls, but in the case of using the transfer sheet, the problem such as the sticking phenomenon can be solved. After the transfer sheet is subjected to a lamination process with the support, the transfer sheet is peeled off and removed.

In addition, the present invention uses a transfer method of spinning nanofibers on a transfer sheet such as paper and laminating the nanofiber spun transfer sheet on a porous nonwoven fabric, to thus absorb a residual solvent contained in a nanofiber web to thereby prevent a re-melting phenomenon that the nanofibers are melted again in the residual solvent and to also properly adjust the amount of the residual solvent.

In general, as a filter layer becomes thick, a phenomenon of generating a lot of differential pressure and reducing a pass flow rate occurs. In order to solve this problem in the present invention, a light weight porous nanofiber web is laminated on a porous nonwoven fabric to thereby form a thin filter layer to thus apply a less differential pressure across the filter medium to thus increase a pass flow rate.

In the present invention, when forming a porous nanofiber web that is laminated to a porous nonwoven fabric, an accumulated amount of nanofibers is set to less than 5 gsm, preferably in a range of 2 to 3 gsm. Accordingly, a membrane with excellent air permeability and excellent water permeability can be prepared even if the hydrophilic treatment may not be performed by using a nanofiber web made of light weight nanofibers even with the use of a hydrophobic PVdF polymer.

In addition, in the present invention, a spinning solution that is obtained by mixing a polymer material, ion exchange resin particles and a solvent is electrospun to one side of the transfer sheet to thus form a nanofiber web in which ion exchange resin particles are dispersed inside or outside the nanofibers. Accordingly, a surface filtration and a depth filtration of a liquid can be performed with the nanofiber web having fine pores of a three-dimensional network structure, and particular ions of a chemical substance contained in the liquid to be treated can be filtered by ion exchange resin particles dispersed inside or outside nanofibers of the nanofiber web.

Furthermore, in the present invention, a predetermined amount of Ag metal salt are added when forming the aforementioned spinning solution, and then the spinning solution with the Ag metal salt is spun, to thus rigidly fix Ag nanoparticles inside or on the surfaces of the nanofibers of the nanofiber web and uniformly dispersing the Ag nanoparticles to thereby eradicate a variety of pathogenic bacteria in the presence of the filter medium by the Ag nanoparticles having an antimicrobial function.

The Ag metal salt can employs one or more selected from the group consisting of silver nitrate is ($AgNO_3$), silver chloride (AgCl), and silver sulfide ($Ag_2S$).

In general, a nanofiber web that is formed by collecting nanofibers by electrospinning has a high porosity structure than a porous support such as a nonwoven fabric.

As a result, when a liquid filter that is manufactured by using a filter media in accordance with the present invention is configured into a filter structure by laminating a filter medium of a two-layer structure in which a nanofiber web having a relatively high porosity and a porous support having a relatively low porosity are stacked over one another into a multi-layer structure, or winding the filter medium of the two-layer structure in a roll type, a liquid to be treated is filtered while passing through the nanofiber web of a light weight structure and having a relatively high porosity, thereby ensuring a good air permeability and a good water permeability while improving filtering efficiency.

The nonwoven fabric that can be used as the porous support can be made of a PP/PE nonwoven fabric in which PE is coated on an outer periphery of a PP fiber as a core, or a PET (polyethyleneterephthalate) nonwoven fabric in which low melting point PET is coated on an outer periphery of a regular PET fiber as a core.

The nonwoven fabric of the double structure maintains the pore structure since the PP fiber or the regular PET fiber that forms a core is able to maintain its shape when the calendering temperature is set according to the melting point of PE or the low melting temperature of PET at the time of laminating the nanofiber web with the nonwoven fabric.

In addition, the PE coating portion and the low melting point PET is melted and combined with the nanofibers during calendaring, to thus increase a bonding force between the nonwoven fabric and the nanofiber web.

Therefore, the present invention uses the porous support made of fibers of the double core structure having two respectively different melting points, to thus keep the pore structure of the porous support while increasing the bonding strength between the porous support and the nanofiber web.

In addition, the present invention may use a porous support made of fibers that is available at low cost, and that may increase the handling properties due to the high tensile strength during the production of filter media, in which the fibers have a double core structure with two respectively different melting points, as other nonwoven fabric.

The polymer material used for the embodiments of the present invention may include, for example, hydrophilic polymers or/and hydrophobic polymers that can be electrospun, or may include one kind of the polymers or a mixture of two or more kinds of the polymers.

In the present invention, the hydrophilic properties may be required in the liquid filtration, but when considering the hydrophilic polymer has a weak mechanical strength and a weak chemical resistance as compared to the hydrophobic polymer, a mixture of the hydrophilic polymer and the hydrophobic polymer may be used to supplement the disadvantages of each of the hydrophilic polymer and the hydrophobic polymer and utilize the advantages thereof.

Also, even though a hydrophobic polymer such as PVdF is used, the filter media made of light weight of less than 5 gsm are manufactured and set to a low differential pressure, and thus may have a good water permeability by imposing an appropriate driving force even when hydrophilic treatment has not been performed.

The polymer materials used in the embodiments of the present invention may be resins that may be dissolved in an organic solvent for electrospinning, and that may be capable of forming nanofibers by electrospinning, but are not specifically limited thereto. For example, the polymer materials used in the present invention may be: polyvinylidene fluoride (PVdF), poly(vinylidene fluoride-co-hexafluoropropylene), a perfluoropolymer, polyvinyl chloride, polyvinylidene chloride, or a copolymer thereof; a polyethylene glycol derivative containing polyethylene glycol dialkylether and polyethylene glycol dialkylester; poly(oxymethylene-oligooxyethylene); polyoxide containing polyethylene oxide and polypropylene oxide; polyvinyl acetate, poly(vinyl pyrrolidone-vinyl acetate), polystyrene, and a polystyrene acrylonitrile copolymer; a polyacrylonitrile copolymer containing polyacrylonitrile (PAN) and a polyacrylonitrile methyl methacrylate copolymer; or polymethyl methacrylate, a poly methyl methacrylate copolymer, or a mixture thereof.

Also, the polymer material used in the present invention may be: aromatic polyester such as polyamide, polyimide, polyamideimide, poly(meta-phenylene isophthal amide), polyester sulfone (PES), polyether ketone, polyetherimide (PEI), polyethylene terephthalate, polytrimethylene terephthalate, or polyethylene naphthalate; polyphosphazene such as polytetrafluoroethylene, polydifenoxiphosphazene, poly {bis [2-(2-methoxyethoxy) phosphazene]}; polyurethane, and polyurethane copolymer containing polyether urethane; or cellulose acetate, cellulose acetate butyrate, cellulose acetate propionate.

The polymer materials that may be particularly desirably used as the filter material of the present invention may be polyacrylonitrile (PAN), polyvinylidene fluoride (PVdF), polyester sulfone (PES), and polystyrene (PS), alone or a mixture of polyvinylidene fluoride (PVdF) and polyacrylonitrile (PAN), a mixture of PVdF and PES, or a mixture of PVdF and thermoplastic polyurethane (TPU).

Thus, the polymer that can be used in the present invention is not particularly limited to a thermoplastic polymer and a thermoset polymer that can be electrospun.

In order to prepare a spinning solution, it is possible to use a single-component solvent, for example, dimethylformamide (DMF), as a solvent mixed with a polymer material. However, in the case that a 2-component solvent is used as a solvent that is used in the spinning solution, it is desirable to use a 2-component solvent that is obtained by mixing a solvent with a relatively high boiling point (BP) and a solvent with a relatively low boiling point (BP).

In the case of a 2-component solvent according to the present invention, it is preferable that a high boiling point solvent and a low boiling solvent are mixed at a weight ratio of about 7:3 to about 9:1.

In the present invention, the ion exchange resin can employ a positive ion exchange resin or a negative ion exchange resin.

That is, the ion exchange resin particles in the present invention may be defined as having a functional group which has an ion exchange capacity on the internal surface thereof, and include a positive ion exchange resin, a negative ion exchange resin, or a positive/negative exchange resin in accordance with exchanged ions.

More specifically, the present invention creates a spinning solution by making a porous organic polymer having an ion exchange capacity or PSDVB (Polystyrene Divinylbenzene) that is a copolymer of polystyrene and divinylbenzene into particles, and mixing the particles with a solvent.

(Structure of Filter Media)

Filter media for liquid filters according to a preferred embodiment of the present invention will be described below with reference to the accompanying drawings.

Figure 2:
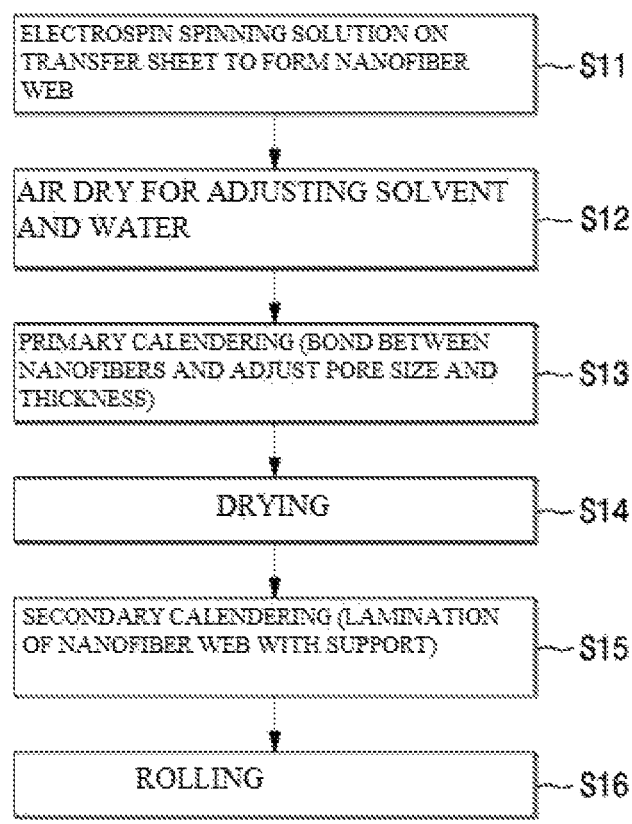
FIG. 2 is a flowchart view showing a manufacturing process of a liquid filter according to a preferred embodiment of the present invention.
Figure 3:
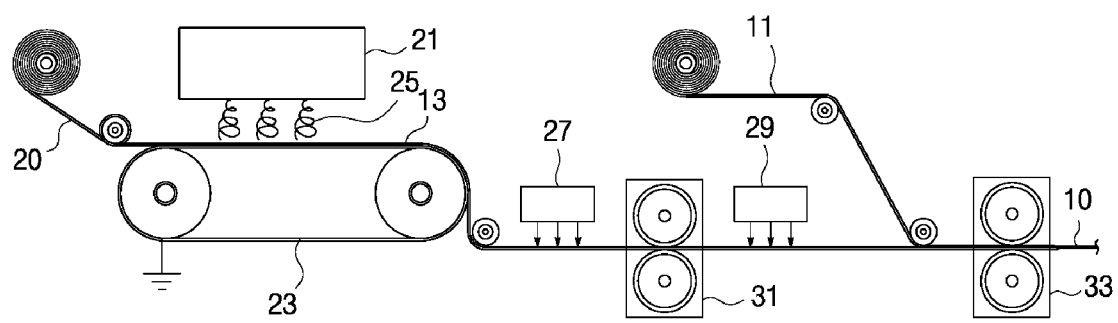
FIG. 3 is a schematic diagram showing an apparatus for manufacturing filter media shown in FIG. 1.

FIG. 1 is a cross-sectional view of a filter medium for liquid filters according to a preferred embodiment of the present invention. FIG. 2 is a flowchart view showing a manufacturing process of a liquid filter according to a preferred embodiment of the present invention. FIG. 3 is a schematic diagram showing an apparatus for manufacturing filter media shown in FIG. 1.

Referring to FIG. 1, a filter medium 10 for a liquid filter according to a preferred embodiment of the present invention is configured so that a porous support 11 such as nonwoven fabric is laminated on one surface of a porous nanofiber web 13.

The nanofiber web 13 is configured so that ion exchange resin particles 15 and Ag nanoparticles 17 are dispersed inside or on the surfaces of nanofibers 25 collected by electrospinning a mixed spinning liquid that is obtained by mixing a polymer material, ion-exchange resin particles, and a solvent, and is configured to include fine pores of a three-dimensional network structure to thus perform surface filtration and depth filtration of a liquid and simultaneously filter certain ions of a chemical substance contained in the liquid.

In addition, it is possible to purify quality of the liquid to be treated and to eliminate various pathogens present in the nanofiber web 13 by the Ag nanoparticles 17 that are uniformly dispersed on and fixed to the surfaces of the nanofibers 25.

The nanofiber web 13 produced by the electrospinning method is separately prepared preferably by using a transfer sheet, and then is laminated with the porous support 11 to thus form a filter medium 10.

Figure 4:
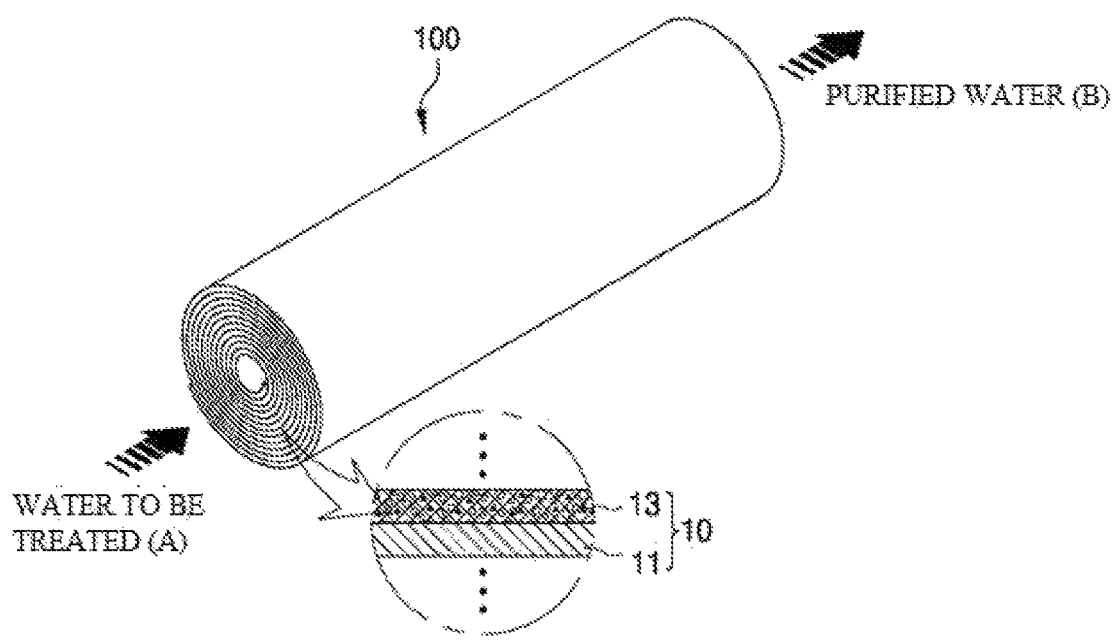
FIG. 4 is a schematic diagram showing a roll-type liquid filter according to a preferred embodiment of the present invention.
Figure 5:
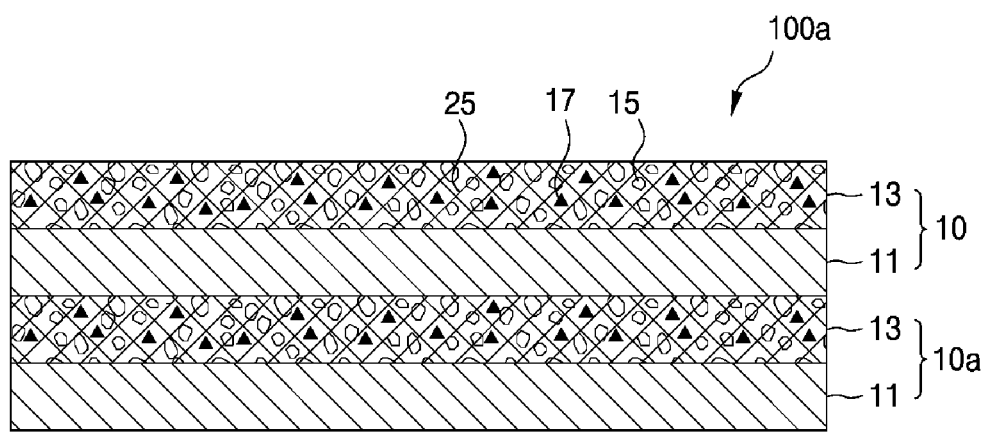
FIG. 5 is a cross-sectional view of a multilayer-type liquid filter according to a preferred embodiment of the present invention.

The filter medium 10 of the two-layer structure is rolled to thus form a roll type liquid filter 100 as shown in FIG. 4, or form a laminate type liquid filter 100a that is stacked in a multi-layer structure through a bending process for increasing a specific surface area, as shown in FIG. 5.

As described above, referring to FIG. 4, when partitioning the layer of the filter medium 10 laminated with the porous support 11, water to be treated (A) is filtered while mainly passing through the nanofiber web 13 having a high porosity instead of the porous support 11 having a low porosity, to thereby obtain the purified water (B) from an outlet of the filter 100, and block a problem that the water to be treated (A) is concentrated and pressed locally.

In the present invention, the diameter of each of the nanofibers constituting the porous nanofiber web 13 is set to 100 to 800 nm, preferably 150 to 300 nm. The thickness of the nanofiber web is set to 2-6 μm, and the pore size of the nanofiber web is preferably set to be in a range of 0.2 to 3 μm. When forming the porous nanofiber web, the accumulated amount of nanofibers is set to less than 5 gsm so that a low weight is made, preferably set to range from 2 to 3 gsm.

The average diameter of the fibers constituting the porous nanofiber web 13 has a very large effect on the pore size and pore size distribution. The smaller the fiber diameter becomes, the smaller the pore size, and the smaller the pore size distribution.

In addition, in the present invention, the smaller the diameter of each of the nanofibers, the average pore size and the maximum pore size decrease. In addition, the smaller the diameter of each of the nanofibers, the density of the nanofibers increase. Accordingly, the basis weight and the average thickness also increase, and air permeability decreases. However, it is possible to filter the finer pollutants, to thus increase a filtering effect.

Further, the liquid filter including the filter medium according to the embodiment of the present invention consumes less energy and has a long life due to the low differential pressure of the filter before and after the filtering process.

(Manufacturing of Filter Media)

Referring to FIGS. 2 and 3, the method of manufacturing the filter media according to the embodiment of the present invention will be described below.

First, a transfer sheet 20 such as paper is supplied from an unwinder on which the transfer sheet 20 has been wound, to the top of a collector 23 of an electrospinning apparatus 21.

Then, a spinning solution is prepared by mixing a polymer material, ion exchange resin particles, a metal salt and a solvent, and then electrospun on the transfer sheet 20, thereby forming a nanofiber web 13 (S11).

A spinning method that may be used to manufacture a nanofiber web according to the present invention may employ any one selected from general electrospinning, electrospray, electrobrown spinning, centrifugal electrospinning, and flash-electrospinning, in addition to air-electrospinning (AES).

The ion exchange resin particles are dispersed inside or on or the surfaces of the nanofibers 25 of the nanofiber web 13, and some of the ion exchange resin particles 15 of all the ion exchange resin particles are exposed to the surfaces of the nanofibers, to thus be involved to filter specific ions contained in the water to be treated (A). Further, the Ag nanoparticles 17 that are derived from the metal salt are stably and uniformly dispersed inside or on the surfaces of the nanofibers 25.

In the present invention, a process of adjusting the amount of the residual solvent and moisture remaining on the surface of the porous nanofiber web 13 may be undergone (S12) while the porous nanofiber web 13 passes through a pre-air dry zone by a pre-heater 27. Then, a calendaring process is undergone.

In the pre-air dry zone by the pre-heater 27, air of 20 to 40° C. is applied to the porous nanofiber web 13 by using a fan, thereby adjusting an amount of the solvent and moisture remaining on the surface of the porous nanofiber web 13. As a result, the porous nanofiber web 13 is controlled so as to be prevented from being bulky. The air blow of the fan plays a role of increasing strength of the film and controlling porosity of the film.

In this case, if calendering is accomplished at a state where evaporation of the solvent has been excessively performed, porosity is increased but strength of the nanofiber web is weakened. Reversely, if less evaporation of the solvent occurs, the nanofiber web is melted.

Meanwhile, the porous nanofiber web 13 may be a low weight porous nanofiber web 13 directly formed on the porous support 11 by the input of the porous support 11 such as a nonwoven fabric to the collector 23 of the electrospinning apparatus 21 instead of the transfer sheet 20.

After forming the porous nanofiber web 13 consisting of ultra-fine nanofibers 25, the resulting porous nanofiber web is formed by calendering at a temperature below the melting point of the polymer in a primary calendering unit 31 (S13).

An inter-fiber bonding temperature of nanofibers, for example, PVdF fibers is 150° C., and PAN is 160° C., PES is 200° C., and the melting point of the nonwoven fabric (PE) is 110~130° C.

Therefore, when a polymer forming the porous nanofiber web 13 is PVdF, and the primary calendering process is performed at about 150° C., the porous nanofiber web 13 made of nanofibers creates a rigid coupling between the fibers through the primary calendering process thereby creating a highly matured porous nanofiber web. When the primary calendering process is done, a coupling is made between the nanofibers to thus control the pore sizes of three-dimensional pores and thickness of the nanofiber web formed by the collection of a large number of the nanofibers 25.

In the present invention, any one method selected from the group consisting of pressing, rolling, thermal bonding and ultrasonic bonding may be performed for a combination of the nanofiber web and the nonwoven fabric, in addition to calendaring that laminates the nanofiber web with the nonwoven web to then perform a hot pressing bond.

In addition, in the present invention, the porous nanofiber web 13 obtained after having carried out the calendering process as required preferably undergoes a process of removing the residual solvent or water by using a secondary hot air dryer 29 at a temperature of 100° C. and with a velocity 20 msec (S14), and is wound on a winder as a take-up roll of the porous nanofiber web 13 in a state in which the transfer sheet 20 is disposed on the inner side of the porous nanofiber web 13.

The two-layer laminate of the porous nanofiber web 13 and the transfer sheet 20 wound around the winder undergoes a lamination process with the porous support 11 such as the nonwoven fabric in a secondary calendering unit 33 (S15).

In this case, when supplying the porous support 11 that has not been pre-heated for the secondary calendaring unit 33, a problem of lowering the set temperature of the roll of the secondary calendering unit 33 by approximately 10-15° C. may occur. Thus, preferably, the porous support 11 is preheated to a slightly lower temperature than the secondary calendering temperature, for example, 80° C., by using a heating roll or an infrared (IR) lamp (not shown), calendering, for example, after the second It is supplied to the calendering apparatus 33, and then is supplied to the secondary calendering unit 33.

The temperature of the secondary calendering unit 33 is set to 110~130° C. which can melt a PE film layer when using a PP/PE nonwoven fabric of a PE-coated double structure on the outer periphery of a PP fiber. As a result, the porous support 11 is laminated with the porous nanofiber web 13 in the secondary calendering unit 33 (S15), and then the transfer sheet 20 is peeled off and removed from the laminated filter medium 10 at the rear end of the secondary calendering unit 33.

The present invention uses a transfer method of spinning nanofibers on a transfer sheet 20 such as paper and laminating the nanofiber spun transfer sheet on a porous nonwoven fabric, and thus executes a calendaring process at a temperature above a melting point of the nonwoven fabric before a laminating process to thereby create a rigid coupling between the nanofibers.

Subsequently, when the filter medium 10 is rolled as shown in FIG. 4 (S16), a roll type liquid filter 100 is obtained.

When the filter medium of the laminated structure of the nanofiber web 13 and the porous support 11 is rolled in the present invention, as shown in FIG. 4, the filter medium 10 of the laminated structure of the nanofiber web 13 and the porous support 11 has a continuously repeated structure from the center of the rolled chemical filter medium (that is a roll axis) to the direction of the outer peripheral surface of the rolled chemical filter medium, or has a repeatedly laminated structure of the filter media 10 and 10*a* of the laminated structure of the nanofiber web 13 and the porous support 11 as shown in FIG. 5, to thereby implement a lamination type liquid filter 100*a*.

Hereinafter, embodiments of the present invention will be described in more detail with reference to the following Examples. However, the following Examples are nothing but the illustration of the invention only, and are not limited to the scope of the invention.

Example 1

In Example 1, PVdF (Polyvinylidene fluoride) as a polymer material was dissolved in a solvent (DMAc:Acetone=7:3) to become 14 wt % to thus prepare a spinning solution. The spinning solution was moved to a mixing tank of an electrospinning apparatus to set a voltage applied to the electrospinning apparatus to 100 kV, a distance from a spinning nozzle and a collector to 20 cm, a discharge amount per minute to 20 μl/hole, and was electrospun under a spinning atmosphere of 30° C. and a relative humidity of 60%, to have prepared a nanofiber web of a weight of 3 gsm with a pore size of 1 μm.

The thus-obtained nanofiber web was calendered under the condition of 150° C. and 1 Kgf/cm$^2$ thereby have formed a bond between the nanofibers and thus have implemented a fixed pore structure, and the calendered nanofiber web was laminated with a nonwoven fabric under the condition of 130° C. and 1 Kgf/cm$^2$ to have produced a filter medium. The nonwoven fabric used in this Example 1 was a nonwoven fabric to be produced in Namyang Nonwoven Fabric Co., Ltd., and used a polyolefin material of thickness 160 μm and 40 gsm.

Figure 6:
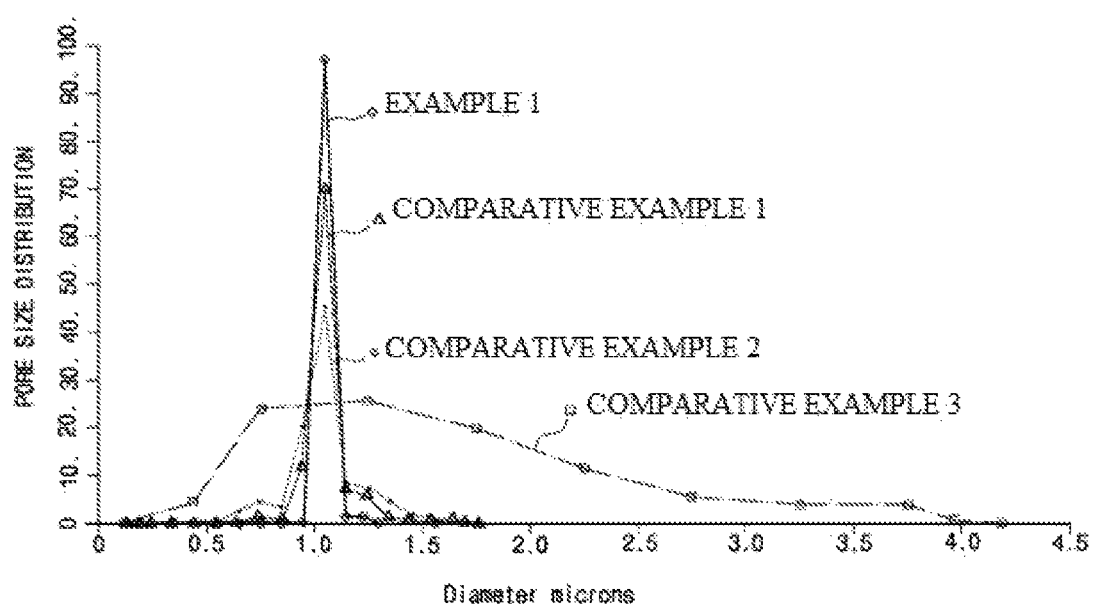
FIG. 6 is a graph showing pore size distributions of Example 1 according to the present invention and Comparative Examples 1 to 3.

For the filter medium material obtained from Example 1, by using a Capillary porosimeter of PMI (Porous Materials, Inc.), the pore size distribution was measured according to the ASTM E1294 standard, and the results were also shown in Table 1 and FIG. 6.

A PVdF membrane of a pore size of 1 μm made in a phase transition manner of Merck-Millipore (Comparative Example 1), a Micro PES membrane of a pore size of 1 μm made in a phase transition manner of Membrana Inc., (Comparative Example 2), and melt-blown media of a pore size of 1 μm made by H & V (Hollingsworth & Vose Company) (Comparative Example 3) were used as control groups

TABLE 1

| | Pore size (μm) | |
| --- | --- | --- |
| | The average pore | The maximum pore |
| Example 1(Nanofibers 1 μm) | 1.0 | 1.3 |
| Comparative Example 1 (PVdF membrane 1 μm) | 1.0 | 1.7 |
| Comparative Example 2 (PES Membrane 1 μm) | 1.0 | 1.6 |
| Comparative Example 3 (Melt-blown 1 μm) | 2.2 | 5.6 |

As illustrated in Table 1 and FIG. 6, the filter medium of Example 1 according to the present invention appeared to have an average pore size of 1.0 μm, and the maximum pore size of 1.3 μm and appeared to have a narrow pore size distribution over the same level as those of commercially available filter membranes of Comparative Examples 1 to 3.

By using FX3300 of TEXTEST for the filter media of Example 1 and Comparative Examples 1 to 3, air permeabilities were measured according to the ASTM D737 standard and the results were shown in Table 2.

TABLE 2

| | Air permeability (cfm@125 Pa) |
| --- | --- |
| Example 1 (Nanofibers 1 μm) | 2.5 |
| Comparative Example 1 (PVdF Membrane 1 μm) | 0.8 |
| Comparative Example 2 (PES Membrane 1 μm) | 1.1 |
| Comparative Example 3 (Melt-blown 1 μm) | 0.7 |

As shown in Table 2, the filter medium of Example 1 according to the present invention was measured as the air permeability of 2.5 cfm@125 Pa, and appeared to have a very high air permeability compared to the commercially available filter membranes of Comparative Examples 1-3.

By using self-made equipment for the filter media of Example 1 and Comparative Examples 1 to 3, filtration was performed according to ASTM F795 standard, differential pressures across the filter media were measured, and the results were shown in Table 3.

TABLE 3

|  | The pressure drop (psid @ 3 lpm, 4.9 cm²) |
| --- | --- |
| Example 1 (Nanofibers 1 μm) | 0.8 |
| Comparative Example 1 (PVdF Membrane 1 μm) | 2.1 |
| Comparative Example 2 (PES Membrane 1 μm) | 1.7 |
| Comparative Example 3 (Melt-blown 1 μm) | 6.2 |

As shown in Table 3, the filter medium of Example 1 according to the present invention was measured as the pressure drop of 0.8 psid @ 3 lpm, 4.9 cm², and appeared to have a very high water permeability as compared to the commercially available filter membranes of Comparative Examples 1-3. By using self-made equipment for the filter media of Example 1 and Comparative Examples 1 to 3, filtrations were performed according to ASTM F795 standard, turbidities for the filtered liquids were measured, and the results were shown in Table 4. The test particles (Dust) were used as ISO 12103-1, A2 fine.

TABLE 4

|  | Turbidity (NTU) |
| --- | --- |
| Example 1 (Nanofibers 1 μm) | 0.4 |
| Comparative Example 1 (PVdF Membrane 1 μm) | 0.4 |
| Comparative Example 2 (PES Membrane 1 μm) | 0.7 |
| Comparative Example 3 (Melt-blown 1 μm) | 2.1 |

As shown in Table 4, the filter medium of Example 1 according to the present invention was measured as the turbidity of 0.4 NTU, and appeared to have very excellent turbidity removal efficiency as compared to commercially available filter membranes of Comparative Examples 1 to 3.

Example 2

In Example 2, PVdF (Polyvinylidene fluoride) as a polymer material was dissolved in a solvent (DMAc:Acetone=7:3) to become 10 wt % to thus prepare a spinning solution. The spinning solution was moved to a mixing tank of an electrospinning apparatus to set a voltage applied to the electrospinning apparatus to 100 kV, a distance from a spinning nozzle and a collector to 20 cm, a discharge amount per minute to 20 μl/hole, and was electrospun under a spinning atmosphere of 30° C. and a relative humidity of 60%, to have prepared a nanofiber web of a weight of 3 gsm with a pore size of 0.45 μm.

The thus-obtained nanofiber web was calendered under the condition of 150° C. and 1 Kgf/cm² thereby have formed a bond between the nanofibers and thus have implemented a fixed pore structure, and the calendered nanofiber web was laminated with a nonwoven fabric under the condition of 130° C. and 1 Kgf/cm² to have produced a filter medium. The nonwoven fabric used in this Example 2 was the same as that of Example 1.

For the filter medium material obtained from Example 2, by using a Capillary porosimeter of PMI (Porous Materials, Inc.), the pore size distribution was measured according to the ASTM E1294 standard, and the results were also shown in Table 5.

A PVdF membrane of a pore size of 0.45 μm of Merck-Millipore (Comparative Example 4), and a Micro PES membrane of a pore size of 0.45 μm of Membrana Inc., (Comparative Example 5) were used as control groups

TABLE 5

|  | Pore size (μm) | |
| --- | --- | --- |
|  | The average pore | The maximum pore |
| Example 2 (Nanofibers 0.45 μm) | 0.39 | 0.59 |
| Comparative Example 4 (PVdF membrane 0.45 μm) | 0.41 | 0.68 |
| Comparative Example 5 (PES Membrane 0.45 μm) | 0.36 | 0.57 |

As illustrated in Table 5 and FIG. 6, the filter medium of Example 2 according to the present invention appeared to have an average pore size of 0.39 μm, and the maximum pore size of 0.59 μm and appeared to have a narrow pore size distribution over the same level as those of commercially available filter membranes of Comparative Examples 4 and 5.

By using FX3300 of TEXTEST for the filter media of Example 2 and Comparative Examples 4 and 5, air permeabilities were measured according to the ASTM D737 standard and the results were shown in Table 6.

TABLE 6

|  | Air permeability (cfm@125 Pa) |
| --- | --- |
| Example 2 (Nanofibers 0.45 μm) | 1.48 |
| Comparative Example 4 (PVdF Membrane 0.45 μm) | 0.31 |
| Comparative Example 5 (PES Membrane 0.45 μm) | 0.34 |

As shown in Table 6, the filter medium of Example 2 according to the present invention was measured as the air permeability of 1.48 cfm@125 Pa, and appeared to have a very high air permeability compared to the commercially available filter membranes of Comparative Examples 4 and 5.

By using self-made equipment for the filter media of Example 2 and Comparative Examples 4 and 5, filtrations were performed according to ASTM F795 standard, differential pressures across the filter media were measured, and the results were shown in Table 7.

TABLE 7

|  | The pressure drop (psid @ 3 lpm, 4.9 cm²) |
| --- | --- |
| Example 2 (Nanofibers 0.45 μm) | 3.8 |
| Comparative Example 4 (PVdF Membrane 0.45 μm) | 6.2 |

TABLE 7-continued

| | The pressure drop (psid @ 3 lpm, 4.9 cm$^2$) |
|---|---|
| Comparative Example 5 (PES Membrane 0.45 μm) | 5.1 |

As shown in Table 7, the filter medium of Example 2 according to the present invention was measured as the pressure drop of 3.8 psid @ 3 lpm, 4.9 cm$^2$, and appeared to have a very high water permeability as compared to the commercially available filter membranes of Comparative Examples 4 and 5.

By using self-made equipment for the filter media of Example 2 and Comparative Examples 4 and 5, filtration was performed according to ASTM F795 standard, turbidities for the filtered liquids were measured, and the results were shown in Table 4. The test particles (Dust) were used as ISO 12103-1, A2 fine.

TABLE 8

| | Turbidity (NTU) |
|---|---|
| Example 2 (Nanofibers 0.45 μm) | 0.1 or less |
| Comparative Example 4 (PVdF Membrane 0.45 μm) | 0.1 or less |
| Comparative Example 5 (PES Membrane 0.45 μm) | 0.1 or less |

As shown in Table 8, the filter medium of Example 2 according to the present invention was measured as the turbidity of 0.1 NTU or less, and appeared to have the same turbidity removal efficiency as compared to commercially available filter membranes of Comparative Examples 4 and 5.

According to the present invention, a surface filtration and a depth filtration of water to be treated can be performed with a nanofiber web having fine pores of a three-dimensional network structure. In addition, the ion exchange resin particles exposed to the nanofibers of the nanofiber web filter specific ions of a chemical substance contained in the water to be treated, to thus improve the filtering efficiency, and to remove a variety of pathogens such as bacteria and *E. coli* multiplied in the filter media by an antimicrobial activity of Ag nanoparticles.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention may be applied to filter media for liquid filters in which a thin filter layer is formed and the content of nanofibers weighs light, by laminating a low weight nanofiber web on a porous nonwoven fabric, and thus a less differential pressure is applied before and after filtering, to thereby increase a pass flow rate.

The invention claimed is:

1. A method of manufacturing a filter medium of liquid filters, the method comprising:
   preparing a spinning solution by mixing a hydrophobic polymer material with a solvent;
   electrospinning the spinning solution on a transfer sheet to form a nanofiber web structure formed of a transfer sheet and a nanofiber web thereon, the nanofiber web having fine pores of a three-dimensional structure and containing nanofibers in less than 5 gsm;
   preheating the nanofiber web structure by passing the nanofiber web structure through a pre-air dry zone, to which an air of 20° C.~40° C. is applied, to adjust an amount of solvent remaining in the nanofiber web;
   primary-calendering the heated nanofiber web structure at a first temperature to perform coupling between the nanofibers and simultaneously adjust pore size and thickness of the nanofiber web, thereby forming a primary nanofiber web structure;
   secondary-calendering the primary nanofiber web structure with a porous support at a second temperature, less than both the first temperature and a melting point of the nanofiber web, to form a secondary nanofiber web structure, the secondary nanofiber web structure being formed of the primary nanofiber web structure and the porous support laminated on the nanofiber web of the primary nanofiber web structure; and
   removing the transfer sheet from the secondary nanofiber web structure.

2. The method of claim 1, wherein the porous support is formed of a double core fiber having a core and a coating portion formed on the core, the coating portion having a melting temperature less than that of the core; and
   wherein the second temperature corresponds to the melting temperature of the coating portion the first temperature.

3. The method of claim 1, wherein the porous support is a PP/PE nonwoven fabric in which PE fiber is coated on an outer periphery of a PP fiber as a core, or a PET (polyethyleneterephthalate) nonwoven fabric in which a low melting point PET is coated on an outer periphery of a regular PET fiber as a core.

4. The method of claim 1, before the secondary-calendering, further comprising: preheating the porous support at a temperature lower than the second temperature.

5. The method of claim 1, wherein the transfer sheet is any one of paper, a nonwoven fabric made of a polymeric material that is not dissolved by the solvent, and a polyolefin-based film.

6. The method of claim 1, wherein, in the primary-calendering, the adjusted thickness is set to range from 2 to 6 μm, and the adjusted pore size thereof is set to 0.2 to 3 μm.

7. The method of claim 1, wherein the spinning solution further comprises: ion exchange resin particles or Ag salts, and wherein the ion exchange resin particles or the Ag metal salts are dispersed inside the nanofibers or exposed on surfaces of the nanofibers.

* * * * *